（12） United States Patent
Khan

(10) Patent No.: US 11,816,967 B2
(45) Date of Patent: *Nov. 14, 2023

(54) WIRELESS NODE NETWORK FOR AUTOMATIC SERIALIZATION OF OBJECTS

(71) Applicant: MonoLets, Inc., Mountain View, CA (US)

(72) Inventor: Osama Khan, Mountain View, CA (US)

(73) Assignee: MonoLets, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/374,581

(22) Filed: Jul. 13, 2021

(65) Prior Publication Data

US 2022/0020256 A1 Jan. 20, 2022

Related U.S. Application Data

(60) Provisional application No. 63/052,794, filed on Jul. 16, 2020.

(51) Int. Cl.
*G08B 13/24* (2006.01)

(52) U.S. Cl.
CPC ....... *G08B 13/248* (2013.01); *G08B 13/2485* (2013.01)

(58) Field of Classification Search
CPC .............. G08B 13/2485; G08B 13/248; G06K 7/10415; G06K 19/0723; G06Q 10/087
See application file for complete search history.

(56) References Cited

U.S. PATENT DOCUMENTS

| 7,969,299 B2 | 6/2011 | Hupp et al. |
| 8,314,704 B2 | 11/2012 | Cova et al. |
| 10,511,289 B2 | 12/2019 | Khan et al. |

(Continued)

FOREIGN PATENT DOCUMENTS

| CN | 105407496 B | 8/2018 |
| EP | 1738470 B1 | 12/2011 |

(Continued)

OTHER PUBLICATIONS

"International Search Report" and "Written Opinion", Patent Cooperation Treaty Patent Application No. PCT/US2021/038289, dated Sep. 15, 2021, 7 pages.

(Continued)

*Primary Examiner* — Mirza F Alam
(74) *Attorney, Agent, or Firm* — Carr & Ferrell LLP

(57) ABSTRACT

Exemplary embodiments include a wireless computing network to automatically provide digital serialization of a plurality of objects, the network including a plurality of wireless nodes located in a physical space, each of the plurality of wireless nodes configured to wirelessly communicate with at least one other wireless node in the network in a secure manner and affixed to a physical object in the physical space via any attachment means, utilize data received from a vision-based system to provide a unique digital identity for the physical object upon which it is affixed and transmit information regarding the physical object upon which it is affixed to a portable wireless computing device.

18 Claims, 3 Drawing Sheets

(56) References Cited

U.S. PATENT DOCUMENTS

| | | |
|---|---|---|
| 10,639,509 B2 | 5/2020 | Skaaksrud |
| 10,727,886 B2 | 7/2020 | Pister et al. |
| 10,958,249 B2 | 3/2021 | Khan et al. |
| 2006/0124738 A1 | 6/2006 | Wang et al. |
| 2010/0026470 A1 | 2/2010 | Wilson et al. |
| 2010/0039284 A1 | 2/2010 | Hall et al. |
| 2010/0289627 A1* | 11/2010 | McAllister ............ H04L 9/3226 340/10.42 |
| 2012/0013468 A1* | 1/2012 | Olah .................... G01S 5/0289 340/572.1 |
| 2015/0139198 A1 | 5/2015 | Hwang et al. |
| 2015/0319634 A1 | 11/2015 | Zwirn |
| 2016/0183093 A1 | 6/2016 | Vaughn et al. |
| 2018/0218205 A1* | 8/2018 | Csaszar .................... H04N 7/18 |
| 2019/0058459 A1 | 2/2019 | Khan et al. |
| 2019/0156166 A1 | 5/2019 | Karthikeyan et al. |
| 2019/0280725 A1 | 9/2019 | Pister et al. |
| 2019/0294833 A1* | 9/2019 | Lu ...................... G06K 19/0723 |
| 2020/0073834 A1 | 3/2020 | Hagdahl et al. |
| 2020/0083869 A1 | 3/2020 | Khan et al. |
| 2021/0234562 A1 | 7/2021 | Pister et al. |
| 2022/0012441 A1 | 1/2022 | Khan |

FOREIGN PATENT DOCUMENTS

| | | |
|---|---|---|
| EP | 3220819 B1 | 9/2021 |
| WO | WO2019108956 A1 | 6/2019 |
| WO | WO2022010637 A1 | 1/2022 |
| WO | WO2022015875 A1 | 1/2022 |

OTHER PUBLICATIONS

"International Search Report" and "Written Opinion", Patent Cooperation Treaty Patent Application No. PCT/US2021/041668, dated Oct. 19, 2021, 8 pages.

* cited by examiner

WIRELESS NODE NETWORK FOR AUTOMATIC SERIALIZATION OF OBJECTS

CROSS-REFERENCE TO RELATED APPLICATIONS

The present application claims the priority benefit of U.S. Provisional Patent Application Ser. No. 63/052,794 filed on Jul. 16, 2020 and titled "Wireless Node Network for Automatic Serialization of Objects," which is hereby incorporated by reference in its entirety.

SUMMARY OF EXEMPLARY EMBODIMENTS

Exemplary embodiments include a wireless computing network to automatically provide digital serialization of a plurality of objects, the network including a plurality of wireless nodes located in a physical space, each of the plurality of wireless nodes configured to wirelessly communicate with at least one other wireless node in the network in a secure manner and affixed to a physical object in the physical space via any attachment means, utilize data received from a vision-based system to provide a unique digital identity for the physical object upon which it is affixed and transmit information regarding the physical object upon which it is affixed to a portable wireless computing device.

The wireless computing network may further include one or more of the plurality of wireless nodes providing a unique identifier for the physical object without receiving data from the vision-based system. The one or more of the plurality of wireless nodes may transmit information regarding a history of locations for the physical object, transmit information for authenticating the physical object, and/or transmit information for determining the physical object is not a counterfeit version of the physical object. In some exemplary embodiments, data is not received from a vision-based system for providing the unique digital identity for the physical object, and instead the physical object has a predetermined unique digital identity and the one or more of the plurality of wireless nodes provides secondary digital identification for the physical object. Additionally, the one or more of the plurality of wireless nodes link an identifier to the physical object's predetermined unique digital identity. In some cases, the physical object's predetermined unique digital identity is read through the vision-based system and transmitted over a wireless link to the one or more of the plurality of wireless nodes. Both the physical object's predetermined unique digital identity and the identifier of the one or more of the wireless nodes may be transmitted to a cloud server.

In further exemplary embodiments, the vision-based system may capture the contents of a paper, document, book, prescription label or a piece of art (and/or capture contents associated with each item) and transfer the contents to one or more of the wireless nodes. A portable wireless computing device or a drone may read the contents from the one or more wireless nodes. In some cases, the contents may be transferred to the wireless nodes without the vision-based system. Additionally, the wireless nodes may be programmed with artificial intelligence computing capability used to process the contents and/or used to respond to user generated queries about the contents.

In some exemplary embodiments, wireless nodes associated with a piece of art may transmit the contents to a user's mobile computing device when the user passes by (or does not pass by) the piece of art. The same may be the case for contents associated with a prescription label having one or more wireless nodes.

BRIEF DESCRIPTION OF THE DRAWINGS

Embodiments are illustrated by way of example and not limitation in the figures of the accompanying drawings, in which like references indicate similar elements.

DETAILED DESCRIPTION

Figure 1:
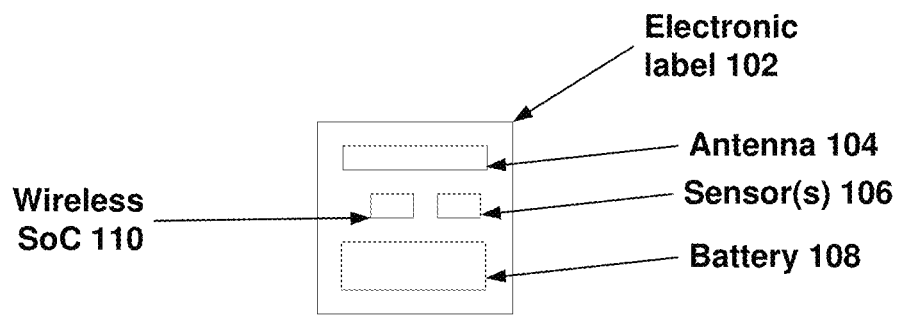
FIG. 1 depicts an exemplary electronic sticker.

While the present technology is susceptible of embodiment in many different forms, there is shown in the drawings and will herein be described in detail several specific embodiments with the understanding that the present disclosure is to be considered as an exemplification of the principles of the present technology and is not intended to limit the technology to the embodiments illustrated.

Embodiments of the present disclosure relate to an electronic label that can be attached to any physical item for tracking, provisioning, quantification of item, or for measurement of any number of characteristics. In exemplary embodiments, the electronic label is capable of being attached to any physical item via any attachment means—adhesive, mechanical, or otherwise.

In an exemplary embodiment, the electronic label is a specially designed and manufactured hardware computing chip with external components either attached or printed directly onto the chip. The external components may be any one or more of an attached or printed antenna (to enable wireless communications), a power source (such as a printed battery, or energy harvester), and a sensor. The electronic label also has wireless firmware, to enable end to end encrypted communications over any wireless network.

Each electronic label is a wireless node in a communications network of a plurality of wireless nodes. Each electronic label can communicate with other neighboring wireless labels using standard protocols and communication technologies like Bluetooth, Bluetooth Low Energy (BLE), IEEE 802.15.4, Wi-Fi, etc. The electronic labels can be composed in any configuration to form a full or partial mesh network. Further, each electronic label is capable of connecting to one or more centralized gateways, such as a Wi-Fi access point, smartphone, tablet, laptop computer, desktop computer, cellular gateways, Low Power Wide Area Network (LPWAN) gateways, satellite gateways, or any other computing device capable of wireless communication. The electronic labels are akin to edge devices in a wireless mesh network.

FIG. 1 depicts an exemplary electronic label 102 (also referred to as digital label or label 120), which also acts as a wireless node in a communication network as discussed herein. The label 102 may have an antenna 104. The antenna may be printed directly onto the hardware chip, or separately attached. Label 102 may also have one or more sensor(s) 106. In exemplary embodiments, sensor(s) 106 may be any of a temperature sensor, clock, humidity sensor, or any other type of sensor relating to a characteristic for measurement. Label 102 also comprises battery 108, which may be a printed battery printed directly onto the hardware chip. Wireless SoC 110 (wireless chip) may also be a part of label 102, enabling wireless communication capability for label 102, such that label 102 acts as a wireless node in a computing network.

While not expressly depicted, other components may also be present on label 102. Also, while not expressly disclosed, label 102 may have other components to enable its functionality such as memory capable of storing software instructions, and one or more processors capable of executing software instructions. Further, the components of label 102 may be of differing size or in a differing location on label 102 than shown in the exemplary figure.

Label 102 may be of any size practical for attachment to an object. In an exemplary embodiment, the electronic label may be 2 cm×2 cm.

Figure 2:
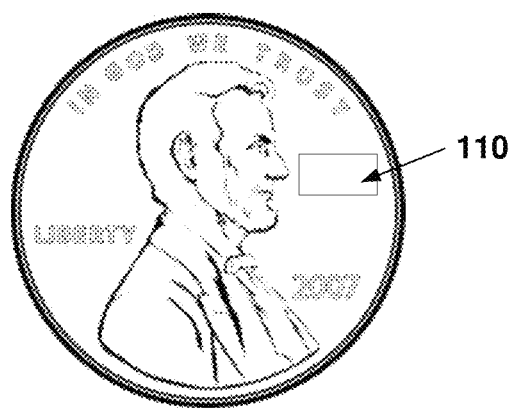
FIG. 2 depicts an exemplary embodiment of wireless SoC.

Wireless SoC 110 may be of a size practical for inclusion on label 102. In exemplary embodiments, the chip is 1 square millimeter in size. In other embodiments, the wireless chip can of other sizes, such as 6 square millimeters (3 mm×2 mm), 4 square millimeters (2 mm×2 mm), or any other size. FIG. 2 depicts an exemplary embodiment of wireless SoC, to show a relative size of wireless SoC in comparison to a penny in US currency.

Figure 3:
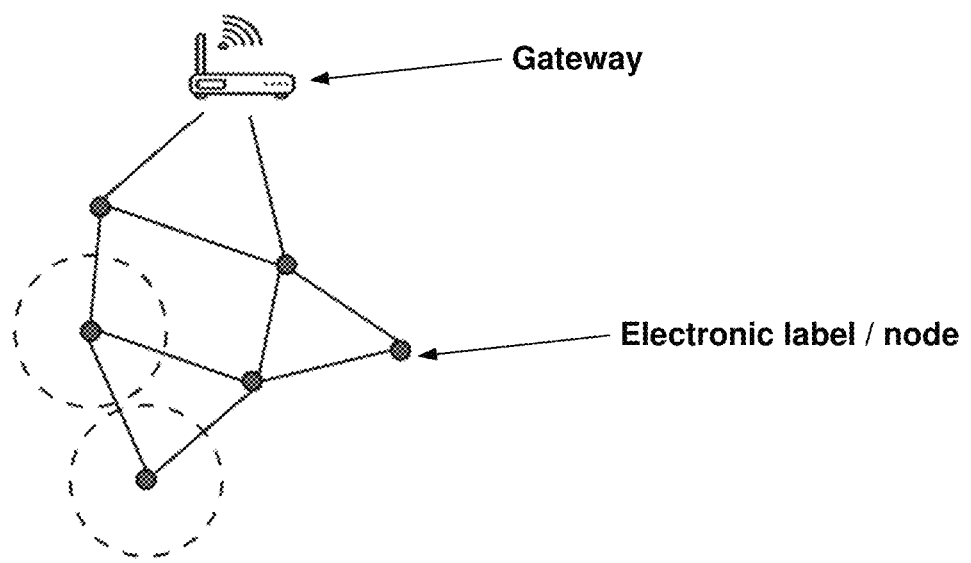
FIG. 3 depicts an exemplary network of electronic stickers as wireless nodes, in communication with one another and a gateway.

FIG. 3 depicts an exemplary network of electronic labels as wireless nodes, in communication with one another and a gateway. While only a few nodes are depicted in FIG. 3 for simplicity, there can actually be millions of nodes in a network. Further, while not expressly depicted in the figure, there can be any number of other components in the network as well, such as routers, switches, actuators, drones, handheld computing devices, robots, industrial robots and/or other devices.

The wireless nodes discussed herein may transmit data to a gateway device at periodic intervals, or upon the meeting of certain triggering conditions. Each electronic label can transmit either all of its captured data to the gateway, or transmit only select pieces of information. The specific data transmitted to the gateway and the time interval at which the data is transmitted to the gateway may be customizable. The frequency of transmission and the cost of transmission are important factors for bandwidth limitations. Alternatively, or additionally, data can be transmitted from an electronic label directly to a user computing device (such as a smartphone, table, smartwatch, laptop, etc.) or from a gateway to a user computing device. The gateway device may transmit this information to a cloud using backhaul communication either through wired or wireless infrastructure.

In further embodiments, a gateway may not always be present in the network of FIG. 3. When a gateway arrives within range (such as through a person walking up with a smartphone), then data may be transmitted to the gateway via a dedicated application operating on the smartphone or through a push notification, text message, standard BLE advertisement beacons or other means. As would be understood by persons of ordinary skill in the art, the gateway can be any computing device, mobile or stationary.

In an exemplary use case, millions of nodes may be deployed in a large warehouse, with multiple gateways communicating with each other. A gateway may be a Wi-Fi access point that is already deployed in the warehouse infrastructure, wired to back haul infrastructure, and connected to a computing cloud. Once an electronic label (edge device) connects to the gateway, it is connected to the Internet at that point.

Use of Label for Serialization of Items

Digital serialization of products is a known process in industrial manufacturing, where each manufactured product is given a unique identification. This identification can be in the form of a unique bar code, QR code, a digital identifier, an alphanumeric identifier, a holographic image, a unique fingerprint, etc. Typically the unique identification for each product is affixed to the product by the manufacturer at the time of manufacturing.

Figure 4A:
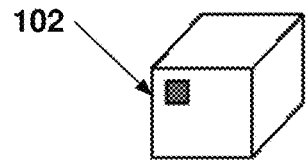
FIG. 4A shows an example where a product is uniquely identified with a digital label.

In embodiments of the present disclosure, the electronic label 102 is utilized as a digital label 102 that is affixed to a physical item, to serve as a unique identifier for that item. FIG. 4A shows an example where a product is uniquely identified with a digital label 102.

If no unique identification is already affixed to the item (such as no barcode, QR code, etc.), then the electronic label 102 is affixed to an item and provides a digital identity for the item. This digital label 102 can be attached to or printed on the product directly at the manufacturing stage. The electronic label 102 provides a unique digital identity that can provide digital serialization services in addition to other benefits (e.g. traceability, authentication and anti-counterfeiting services, etc.). That is, by reading the digital label 102 by any enabled wireless computing device, a history of location of the item can be traced, the item can be authenticated, and/or the item can be determined to not be a counterfeit version.

In some embodiments where an item already has a unique identifier affixed to it (such as a barcode, QR code, etc.), then the electronic label 102 is affixed to the item as well, to provide a secondary digital identification for the item. Typically, the electronic label 102 may be affixed to the item at the time of the item's manufacture by the manufacturer or by a third party.

Figure 4B:
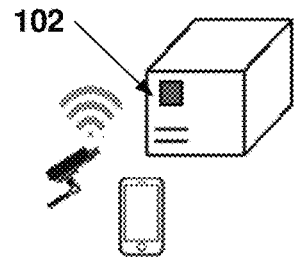
FIG. 4B shows an example of a provisioning process that can be performed by reading the previous serialization information through a vision-based system.

When the electronic label 102 is affixed to the item, the digital identifier associated with the electronic label 102 is linked to the unique identifier previously assigned by the manufacturer. That is, the digital label 102 is linked with previously generated or printed serialization information on the product. As shown in FIG. 4B, this provisioning process can be done by first reading the previous serialization information through a vision based system, e.g. through a commercial camera, portable camera (on a mobile phone, tablet, etc.), or special hardware programmed to read holographic images. The hardware then transfers this information over a wireless link to the digital label 102 and links the unique digital identity of the label 102 with the previously printed product serialization information. This process is automated without requiring any human intervention. Thus, thousands of items can be labeled automatically in this manner, at a much greater speed than current systems that require human involvement. Further, with the automation, there is less chance of human error.

In other exemplary embodiments where an item already has a unique identifier affixed to it (such as a barcode, QR code, etc.), then the electronic label is affixed to the item as well with its own unique identifier (such as barcode, QR code, etc.), to provide a secondary digital identification for the item. Typically, the electronic label may be affixed to the item at the time of the item's manufacture by the manufacturer, or by a third party.

When the electronic label is affixed to the item, the digital identifier associated with the electronic label is linked to the unique identifier previously assigned by the manufacturer. That is, the digital label is linked with previously generated or printed serialization information on the product. This provisioning process can be done by utilizing a vision based system to read the previous serialization information, as well as the serialization information from the electronic label, and transmit this information to a cloud or local server. The server then processes the two QR/barcodes and links the two digital identities. In this embodiment, the vision based system doesn't need to communicate wirelessly with the electronic label for provisioning.

The information read by the vision system, and/or the digital label 102 information can be transmitted and maintained in a data structure (such as a database), stored in a local or remote physical or virtual server, such as a cloud computing server.

Figure 4C:
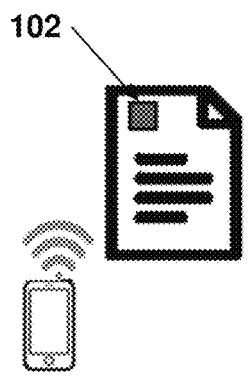
FIG. 4C shows an example of a unique digital identification of a product that can be read by a consumer through a wireless device communicating with the digital label.

As shown in FIG. 4C, the unique digital identification of the product then can be read by a consumer through a wireless device communicating with the digital label 102, e.g. through a mobile phone, tablet, or other portable computing device. By scanning the digital label 102 with the portable wireless device, the user of the portable wireless computing device can instantaneously receive the serialization information about the item, as well as other relevant information (such as authenticity, history of location of item, contents, etc.). This information may be transmitted to the portable wireless computing device via a dedicated software application operating on the portable wireless computing device, or via a text message, push notification, or other notification means.

In industrial or logistics application, the unique digital label 102 can also be read with a hand held device e.g. through a cell phone or a tablet or by a pre-configured wired or battery powered wireless infrastructure that can communicate wirelessly with the digital labels 102. For example, a gateway device can communicate wirelessly with all the digital labels 102 attached to products inside a container over a wireless mesh network. Wall mounted or ceiling attached gateways or wireless access points can also communicate with the digital labels 102 attached to products or people inside large buildings e.g. industrial warehouses.

In other embodiments, the contents of a paper, a document, a book, or a piece of art can be captured with a vision based system. The vision system then transfers this information wirelessly to the attached digital label 102. This stored digital information can then be read wirelessly by a cell phone, tablet, or other portable wireless computing device. That is, when a portable wireless computing device scans the digital label 102, information about the contents of the item may also be presented to the user of the portable wireless computing device.

In further embodiments, the contents of a paper, a document, a book, or a piece of art can be explicitly programmed into the digital label 102 through a wireless device interacting with the digital label 102 without a vision system.

The digital information retrieved from the digital label 102 can then be processed with an artificial intelligence (AI)/machine learning (ML) data pipeline. For example a mobile phone device can read the contents of a document wirelessly and the AI/ML pipeline can process the data and present to a user either the raw data or a contextual summary on a mobile phone or tablet. In addition, the AI/ML pipeline can provide predictions of data that may be lost in transit from a digital label 102, due to collisions, delayed or lost packets, link failures, etc.

The AI software may operate locally on each individual digital label 102, since each digital label 102 has local computing capabilities. In other embodiments, the AI software operates on a gateway device present in the network. In further embodiments, the AI software operates on a separate server in communication with a digital label 102, either directly or indirectly.

In an example scenario, the entire content of a book can be read wirelessly by a mobile phone or a tablet by interacting with the digital label 102. The book can then be processed and indexed with the AI/ML data pipeline to provide contextual services to the user. The AI/ML data pipeline can also respond to user generated queries relevant to the content of the data captured.

In other exemplary embodiments, the digital label 102 can be affixed to a work of art. A picture can be taken of the work of art with a camera and contextual information about the artwork can be stored in the digital label 102. When a user passes by the artwork, the user's mobile computing device (such as mobile phone) can interact with the digital label 102 and retrieve the contextual information about the artwork. This information may be received via a dedicated application operating on the mobile device, or via a notification retrieved on the mobile device.

Figure 4D:
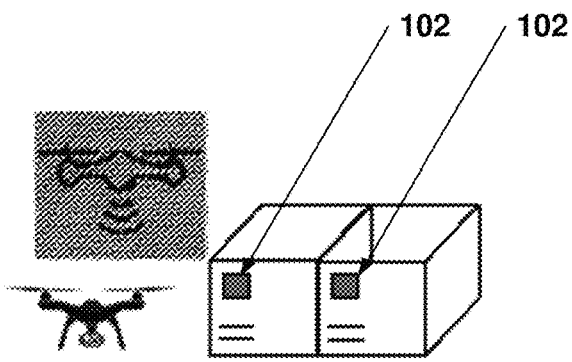
FIG. 4D shows an example where a drone may fly by and read all of the digital labels in an area through a wireless link to each of the labels.

As shown in FIG. 4D, a drone may fly by and read all of the digital labels 102 in an area through a wireless link to each of the digital labels 102. A drone can also interact wirelessly with the digital label 102 attached to the product to read unique product information in addition to providing or receiving other digital services, as discussed herein. A drone or multiple drones can interact with the digital labels 102 over a wireless mesh network.

In another exemplary use case, a digital label 102 may be affixed to a pharmaceutical prescription container. A camera may read information from the label of the prescription and this information may be stored on the digital label 102. When an authorized mobile device (such as robot, drone, mobile phone, tablet, etc.) is in range, information about the prescription may be transmitted to, and/or displayed on, the authorized mobile device.

Further, the medical data read by the camera from the prescription container goes through an AI/machine learning pipeline, which may suggest some other information to the authorized mobile device.

While these specific examples are discussed herein for serialization, it would be understood by persons of ordinary skill in the art that similar mechanisms can be used for serialization of any type of item with the presently disclosed digital label 102.

Other Exemplary Uses Cases

In other exemplary use cases, the electronic label nodes can be deployed in any physical space, stationary or mobile. For example, electronic labels can be placed on objects that are in transit, such as in a truck, airplane, railroad, ship, etc. When the objects are in transit and in motion, the electronic labels can aid in gleaning information about what is happening with the attached objects in real time.

Further, in various scenarios the nodes may be communicating with one another without regular transmissions to a gateway. For example, products may be offloaded from a truck and there is no gateway within the truck. A forklift may come in and unload the pallet. In these cases, a drone may fly by or a person may walk by with a computing device, and an automated summary is transmitted by one or more of the nodes to the drone or computing device. Prior systems require a person to manually read all individual labels 102 of objects with a handheld device, such as a barcode scanner or QR code scanner. By attaching an electronic label 102 to each object, and each individual label 102 acting as a wireless node in a network, each item can be automatically traced and accounted for, significantly reducing manual human labor cost and time associated with real-time inventory updates.

In the description, for purposes of explanation and not limitation, specific details are set forth, such as particular embodiments, procedures, techniques, etc. in order to provide a thorough understanding of the present technology. However, it will be apparent to one skilled in the art that the present technology may be practiced in other embodiments that depart from these specific details.

While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps in a different order, and some processes or steps may be deleted, moved, added, subdivided, combined, and/ or modified to provide alternative or sub-combinations. Each of these processes or steps may be implemented in a variety of different ways. Also, while processes or steps are at times shown as being performed in series, these processes or steps may instead be performed in parallel, or may be performed at different times.

While various embodiments have been described above, it should be understood that they have been presented by way of example only, and not limitation. The descriptions are not intended to limit the scope of the present technology to the particular forms set forth herein. To the contrary, the present descriptions are intended to cover such alternatives, modifications, and equivalents as may be included within the spirit and scope of the present technology as appreciated by one of ordinary skill in the art. Thus, the breadth and scope of a preferred embodiment should not be limited by any of the above-described exemplary embodiments.

What is claimed is:

1. A wireless computing network to automatically provide digital serialization of a plurality of objects, the network comprising:
   a plurality of wireless nodes located in a physical space, each of the plurality of wireless nodes being attached to a physical object, each of the plurality of wireless nodes being a label having an antenna, at least one sensor, and a system on a chip, each of the plurality of wireless nodes configured to:
   wirelessly communicate with at least one other wireless node in the network in a secure manner to create a wireless mesh between the plurality of wireless nodes;
   communicate with other ones of the plurality of wireless nodes in the wireless mesh when no gateway is available;
   collect data from the at least one sensor of a portion of the plurality of wireless nodes, information pertaining to the physical object; and
   transmit the data from the wireless mesh to a portable wireless computing device or to a gateway device;
   one or more of the plurality of wireless nodes linking an identifier to the physical object's predetermined unique digital identity; and
   first reading the physical object's predetermined unique digital identity through a vision-based system.

2. The wireless computing network of claim 1, further comprising one or more of the plurality of wireless nodes providing a unique identifier for the physical object without receiving data from the vision-based system.

3. The wireless computing network of claim 1, further comprising the one or more of the plurality of wireless nodes transmitting information regarding a history of locations for the physical object.

4. The wireless computing network of claim 1, further comprising the one or more of the plurality of wireless nodes transmitting information for authenticating the physical object.

5. The wireless computing network of claim 1, further comprising the one or more of the plurality of wireless nodes transmitting information for determining the physical object is not a counterfeit version of the physical object.

6. The wireless computing network of claim 1, further comprising transmitting the physical object's predetermined unique digital identity over a wireless link to the one or more of the plurality of wireless nodes.

7. The wireless computing network of claim 6, further comprising transmitting the physical object's predetermined unique digital identity and the identifier of the one or more of the plurality of wireless nodes to a cloud server.

8. The wireless computing network of claim 7, further comprising the vision-based system capturing contents of a paper, document, book, prescription label or a piece of art.

9. The wireless computing network of claim 8, further comprising the vision-based system transferring the contents to the one or more of the plurality of wireless nodes.

10. The wireless computing network of claim 9, further comprising the portable wireless computing device or a drone reading the contents from the one or more of the plurality of wireless nodes.

11. The wireless computing network of claim 10, further comprising the contents being transferred to the one or more of the plurality of wireless nodes without the vision-based system.

12. The wireless computing network of claim 11, further comprising the one or more of the plurality of wireless nodes programmed with artificial intelligence computing capability.

13. The wireless computing network of claim 12, further comprising the artificial intelligence computing capability being used to process the contents.

14. The wireless computing network of claim 13, further comprising the artificial intelligence computing capability being used to respond to user generated queries about the contents.

15. The wireless computing network of claim 14, further comprising the one or more of the plurality of wireless nodes associated with the piece of art transmitting the contents to a user's mobile computing device.

16. The wireless computing network of claim 14, further comprising the one or more of the plurality of wireless nodes associated with the piece of art transmitting the contents to a user's mobile computing device when the user passes by the piece of art.

17. A wireless computing network to automatically provide digital serialization of a plurality of objects, the network comprising:
   a plurality of wireless nodes located in a physical space, each of the plurality of wireless nodes configured to:
   wirelessly communicate with at least one other wireless node in the network in a secure manner;
   affix to a physical object in the physical space;

utilize data received from a vision-based system to provide a unique digital identity for the physical object upon which it is affixed;

read, by the vision-based system, data on the physical object that was placed on the physical object by a manufacturer of the physical object; and transmit the unique digital identity and the data on the physical object to a portable wireless computing device that links the unique digital identity;

one or more of the plurality of wireless nodes linking an identifier to the physical object's unique digital identity; and first reading the physical object's unique digital identity through the vision-based system.

18. A wireless computing network to automatically provide digital serialization of a plurality of objects, the network comprising:

a plurality of wireless nodes located in a physical space, each of the plurality of wireless nodes being a label having an antenna, at least one sensor, and a system on a chip, each of the plurality of wireless nodes configured to:

wirelessly communicate, using end-to-end encryption, with at least one other wireless node in the network in a secure manner;

affix to a physical object in the physical space;

utilize data received from a vision-based system to provide a unique digital identity for the physical object upon which it is affixed;

read, by the vision-based system, data on the physical object that was placed on the physical object by a manufacturer of the physical object;

transmit the unique digital identity and the data on the physical object to a cloud-based computing device that links the unique digital identity and the data on the physical object to form linked information; and one or more of the plurality of wireless nodes linking an identifier to the physical object's unique digital identity; and first reading the physical object's unique digital identity through a vision-based system.

\* \* \* \* \*